United States Patent
Coutier

(10) Patent No.: US 8,585,028 B2
(45) Date of Patent: Nov. 19, 2013

(54) DOOR SPACER FOR A VEHICLE ASSEMBLY LINE

(75) Inventor: Charles Coutier, Cattenom (FR)

(73) Assignee: Coutier Industrie S.A.R.L., Basse Ham (FR)

(*) Notice: Subject to any disclaimer, the term of this patent is extended or adjusted under 35 U.S.C. 154(b) by 276 days.

(21) Appl. No.: 13/124,929

(22) PCT Filed: Oct. 26, 2009

(86) PCT No.: PCT/FR2009/001248
§ 371 (c)(1),
(2), (4) Date: Apr. 19, 2011

(87) PCT Pub. No.: WO2010/049606
PCT Pub. Date: May 6, 2010

(65) Prior Publication Data
US 2011/0198791 A1      Aug. 18, 2011

(30) Foreign Application Priority Data

Oct. 27, 2008    (FR) .................................... 08/05954

(51) Int. Cl.
*B23Q 1/25*      (2006.01)
(52) U.S. Cl.
USPC ........................................... 269/55; 269/905

(58) Field of Classification Search
USPC ...................... 269/55, 56, 58, 59, 74–76, 905
See application file for complete search history.

(56) References Cited

FOREIGN PATENT DOCUMENTS

| | | | |
|---|---|---|---|
| FR | 2854862 A | | 11/2004 |
| JP | 11262706 A | * | 9/1999 |
| JP | 2001205150 A | * | 7/2001 |
| WO | WO 2006/123078 A1 | | 11/2006 |

* cited by examiner

*Primary Examiner* — Lee D Wilson
*Assistant Examiner* — Jamal Daniel
(74) *Attorney, Agent, or Firm* — Muncy, Geissler, Olds & Lowe, PLLC

(57) ABSTRACT

An assembly jig includes a first frame adjustably fastened to a vehicle body in the vicinity of a door opening, a second frame with supporting the door of the vehicle, and link arms between the first and second frames that are hinged to the first and second frames so as to form a deformable quadrilateral in association therewith. Hinges between the arms and the frames include at least one ball joint arranged between a carrier element secured to one of the frames or arms and a carried element secured to one of the arms or frames, carrying being relative to the effect of gravity, wherein at least one of the carrier and carried ball joint elements is secured to the corresponding arm or frame in such a manner that the position in three-dimensional space of the center of the ball joint is adjustable in three spatial directions.

4 Claims, 1 Drawing Sheet

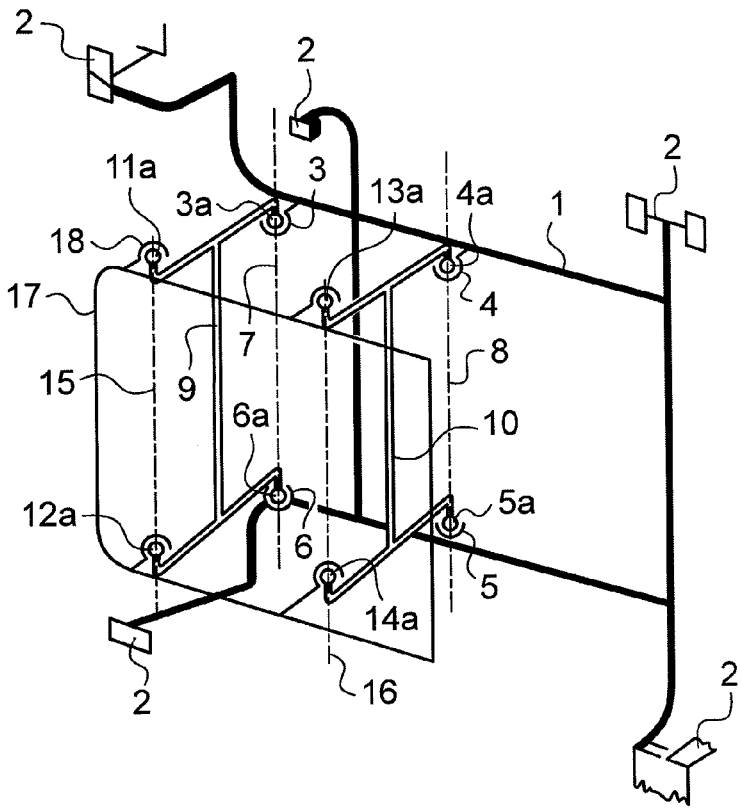
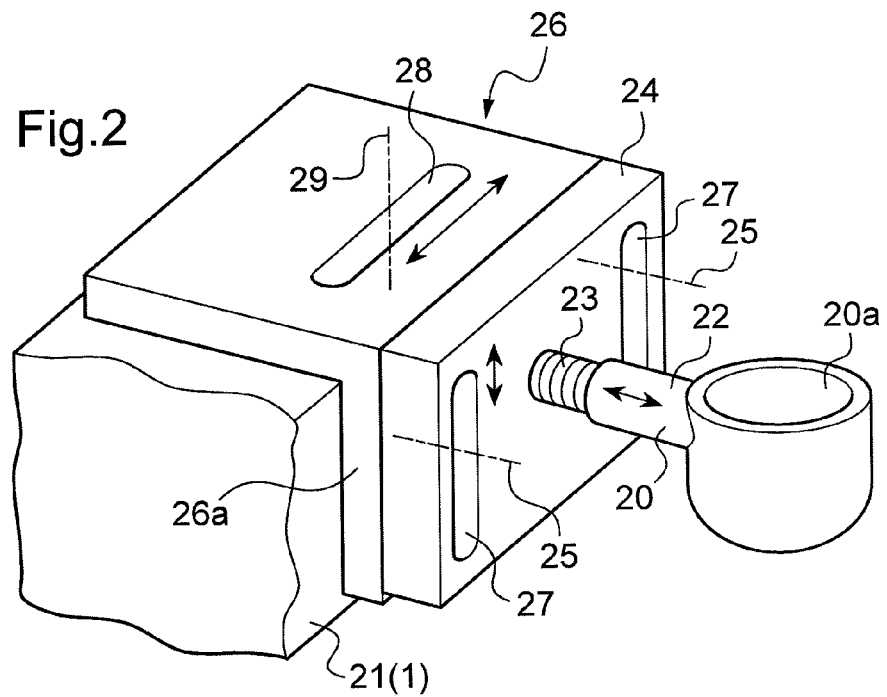

DOOR SPACER FOR A VEHICLE ASSEMBLY LINE

The present invention relates to a jig for temporarily associating a vehicle door with the body of the vehicle, in particular on a vehicle assembly line.

The device is also referred to as a spacer.

In order to be able to coat the vehicle body and its doors correctly in paint, it is appropriate for them to be associated by means of a connection device that enables the door to be shifted parallel to itself (and to the body opening that is to receive it) and, optionally to enable the door to pivot about a hinge axis that is substantially vertical, in order to access either the inside of the body through the door opening, or the inside face of the door.

The door needs to be appropriately positioned relative to the body, at least when the door is situated close to the opening it is to close. This positioning needs to be accurate in particular for reasons concerning the distance that is to be conserved between the surface for painting and the paint gun, and also in order to control the "shadow" effects that are induced by moving the painted surfaces simultaneously relative to the spray direction of the paint.

BACKGROUND OF THE INVENTION

Present devices or jigs are formed by two frames that are hinged to each other by means of two intermediate levers that co-operate with the two frames to form a hinged parallelogram.

One of the frames possesses means for fastening it to the vehicle body in register with the door opening. The other frame possesses means for supporting the door itself. In certain applications, these support means include a third frame that is hinged to the second frame and that actually supports the door.

Such assembly jig structures are usually made by a machine welding technique with manufacturing tolerances that are large in order to keep cost price down. In particular, the pivots of the hinges between the frames are of the door hinge type with hinge pins that co-operate with eyelets in a hinge plate or strap. The accuracy with which such hinge portions are assembled by welding requires a considerable amount of slack to be arranged between the knuckle and the eye, which slack degrades the accuracy of the relative positioning of the frame and thus of the positioning of the door panel relative to the body. Unfortunately such positioning needs to be accurate, at least when the frames are pressed one against the other and the door is close to its opening. In addition, that large amount of slack leaves a gap that becomes filled with door treatment material (paint, stripper, . . . ), which can lead to the pivots rapidly becoming clogged such that provision must be made for frequent cleaning, thus requiring considerable action to be taken on the equipment.

In order to remedy those drawbacks, proposals have been made—see FR 2 854 862—for a vehicle door mounting jig that comprises a first frame with means for adjustably fastening it on a vehicle body close to a door opening, and a second frame with means for supporting the vehicle door on said second frame, connection arms for connecting the first frame to the second being hinged to the first frame and to the second frame so as to co-operate therewith to form a deformable parallelogram in which the hinges between the arms and the frames are ball joints.

That disposition is entirely satisfactory in production. However while it is being constructed it requires considerable accuracy in the geometrical fastening of the ball joints in each jig, which fastening, in order to achieve such accuracy, constitutes considerable expense in terms of labor and increases the cost price of jigs.

OBJECT OF THE INVENTION

The invention constitutes an improvement to the device of FR 2 854 862, and it enables each jig to be properly calibrated in a few minutes, i.e. it makes it possible quickly to obtain the positions for the various ball joints so that the door panel is correctly placed relative to the body, in particular when the panel is pressed against the vicinity of the door.

BRIEF SUMMARY OF THE INVENTION

To this end, the invention thus provides an assembly jig for a vehicle door panel, the jig comprising a first frame with means for adjustably fastening it to a vehicle body in the vicinity of a door opening, a second frame with means for supporting the door of the vehicle on the second frame, link arms between the first and second frames that are hinged to the first and second frames so as to form a deformable quadrilateral in association therewith, the hinges between the arms and the frames being hinges including at least one ball joint arranged between a carrier element secured to one of the frames or arms and a carried element secured to one of the arms or frames, carrying being relative to the effect of gravity, wherein at least one of the carrier and carried ball joint elements is secured to the corresponding arm or frame in such a manner that the position in three-dimensional space of the center of the ball joint is adjustable in three spatial directions.

The advantages of this configuration appear, among others, from the description given below of a jig in accordance with the invention.

BRIEF DESCRIPTION OF THE DRAWING

Reference is made to the accompanying drawing, in which:

FIG. 1 shows the prior art; and

FIG. 2 shows a detail of an embodiment of a ball joint implemented in accordance with the invention.

DETAILED DESCRIPTION OF THE INVENTION

In FIG. 1, the frame that is to co-operate with the bodywork is given reference 1. It is provided with means 2 for adjustably fastening it to the bodywork (not shown) in the vicinity of a door opening. The frame 1 includes, by way of example, four spherical sockets 3, 4, 5, and 6 that are upwardly open, thereby defining two axes 7 and 8. Because these sockets are upwardly open, they constitute carrier elements that carry the joints with respect to gravity. They could be balls.

Arms 9 and 10, here shown as being H-shaped, carry balls 3*a*, 4*a*, 5*a*, and 6*a* at one of their ends, which balls co-operate with the above-mentioned sockets. At their other ends, each of the arms carries a pair of balls 11*a*, 12*a*, and 13*a*, 14*a* that are upwardly directed. These balls are the carrier elements of the corresponding joints and they also define axes of rotation 15 and 16 for a frame 17 for supporting a door panel (not shown). The frame 17 possesses spherical sockets such as 18 for co-operating with the balls 11*a*, 12*a*, 13*a*, and 14*a*. These sockets are downwardly open and they are therefore the carried elements of the joints.

Each ball joint is itself known.

It possesses a male element having a ball and fitted to a frame or an arm. It also possesses a female element in the form of a blind tubular endpiece (socket) having a bottom wall that defines a hemispherical inside surface of the socket with the same diameter as the ball that is likewise fitted on a frame or an arm.

FIG. 2 shows how a female element 20 constituting a spherical socket 20a is mounted on an upright 21 of a frame such as the frame 1. This female element faces upwards, as do all of those carried by the frame 1. It comprises an endpiece 22 that co-operates by screw fastening with a pin 23 that is secured to a base 24; depending on the extent of screw fastening, this fastening enables the spherical socket 20a to be moved towards or away from the base 24. The base is fastened by screws 25 to a vertical flange 26a of a bracket 26 via slots 27 that enable the base 24 to be adjusted in the vertical direction relative to the bracket 26. The horizontal flange of the bracket 26 is fastened to the upright 21 of the frame 1 by means of a screw 29 passing through an elongate slot 28, thereby enabling the position of the assembly along the upright 21 to be adjusted.

Thus, the position of the socket can be adjusted along three directions in three-dimensional space. The purpose of this description is merely to illustrate one of numerous means that can be implemented for enabling such adjustment to be performed. For example, adjustment in the direction of the oblong slots 25 may be replaced by a set of spacers that can be inserted between the upright 21 and the horizontal flange of the bracket 26, with the base 24 then being omitted.

It is also possible to share the available adjustment directions between the spherical socket and the ball of a joint, should that be simpler under certain circumstances compared with others.

The mode of operation is then simple: in the factory, the frame 1 is placed on a dummy that represents the opening in the body. All of the ball joints are engaged on their supports with light clamping such that their positions can be modified with little force.

The frame 17 carries the door panel for fitting to the vehicle so that it can be moved by hand on the dummy of the jig into the desired position. With the position adjustment means of the joints in a medium position, corresponding to the ideal position in accordance with the initial design plans for the vehicle, the operator fastens the door to the frame 17 with appropriate means that are provided on the frame, and moves the frame 17 towards the frame 1. In this position, the operator acts on the adjustment means for placing the frame 17 in the required position that necessarily differs from the ideal position, given manufacturing tolerances for the equipment. Once the correct position has been reached, the adjustment means are held by being clamped or even by being fastened permanently such as by welding. The jig is then fastened in the geometrical position that is appropriate for its use on an assembly line.

It should be mentioned that these adjustment means are most advantageous when launching a new vehicle.

Final adjustment of a vehicle assembly line takes place in interactive manner. During this stage it is not uncommon for it to be necessary to act not only on the tooling but also on the part itself in order to be able to achieve a solution that is satisfactory and capable of being duplicated.

The freedoms of movement of the joints of the invention have the advantage of frequently limiting the amount of "retouching" that it would otherwise probably have been necessary to perform on the bodywork part (door panel).

It is also stated that the adjustment means are designed so that the operator who is performing the handling can gain access thereto via a face of the jig that is the outside face of the frame 1. The other face is occupied by the frame 17 that is pressed against the frame 1 and above all that is occupied by the door panel.

Finally, in the example described, all of the hinges are ball joints. It would not go beyond the ambit of the invention to conserve certain cylindrical hinges, e.g. those that are the least exposed to dirtying and insofar as they present structural slack enabling them to accommodate variations in position of a pivot pin.

What is claimed is:

1. An assembly jig for a vehicle door panel, the jig comprising:
    a first frame adjustably fastened to a vehicle body in the vicinity of a door opening;
    a second frame supporting the door of the vehicle; and
    link arms between the first and second frames that are connected by hinges to the first and second frames so as to form a deformable quadrilateral in association therewith, the hinges between the arms and the frames being hinges including at least one ball joint arranged between a carrier element secured to one of the frames or arms and a carried element secured to one of the arms or frames, carrying being relative to the effect of gravity,
    wherein at least one of the carrier and carried ball joint elements is secured to the corresponding arm or frame in such a manner that the position in three-dimensional space of the center of the ball joint is adjustable in three spatial directions relatively to the corresponding arm or frame that said at least one of the carrier and the carried ball joint elements is secured to.

2. The jig according to claim 1, wherein adjustment of said at least one ball joint is accessible by a face of the jig that is remote from the frame for supporting the door panel.

3. The jig according to claim 2, wherein the adjustment of the at least one ball joint is locked after the shape of the jig has been adjusted.

4. The jig according to claim 1, wherein all of the hinges of the jig are ball joints.

\* \* \* \* \*